United States Patent Office

3,535,404
Patented Oct. 20, 1970

3,535,404
UNSATURATED POLYESTER RESINS CONTAINING TETRACARBOXYLIC ACIDS OR DIANHYDRIDES
Walter P. Barie, Jr., Glenshaw, and Norman W. Franke, Penn Hills, Pa., assignors to Gulf Research & Development Company, Pittsburgh, Pa., a corporation of Delaware
No Drawing. Filed Nov. 13, 1967, Ser. No. 682,599
Int. Cl. C08f 21/02
U.S. Cl. 260—871   10 Claims

ABSTRACT OF THE DISCLOSURE

Ethylenically unsaturated polyesters containing up to about 5% by weight of a tetracarboxylic acid or dianhydride, such as 3,4,3',4'-benzophenone tetracarboxylic dianhydride, are disclosed. Such polyesters copolymerized with vinyl monomers are also disclosed.

---

This invention relates to novel ethylenically unsaturated polyesters. More particularly, this invention relates to curable thermosetting compositions containing a novel ethylenically unsaturated polyester and a polymerizable monomer containing a $CH_2=C=$ group.

Ethylenically unsaturated resins which may be crosslinked by means of a polymerizable monomer such as styrene are well known in the art. Such polyesters are conventionally prepared by reacting an ethylenically unsaturated acid or anhydride, such as maleic acid or anhydride, with a glycol, such as ethylene glycol. Carboxylic acids of anhydrides which contain no ethylenic unsaturation, such as phthalic acid or anhydride, are commonly incorporated into the polyester to modify the properties thereof. The polyester is dissolved in the polymerizable monomer and the composition is placed in the environment of its intended use prior to curing—e.g., it may be used to impregnate layers of glass fiber to prepare a glass fiber reinforced article or molded into a cast article. The composition may then be cured in the presence of a free radical catalyst such as benzoyl peroxide, the polymerizable monomer acting as a crosslinking agent between unsaturated polyester chains.

It is an object of this invention to provide an improved ethylenically unsaturated resin which may be copolymerized with a vinyl monomer to obtain a cured resin having improved properties.

It is a further object of this invention to provide a curable composition comprising a novel ethylenically unsaturated polyester resin and a polymerizable monomer.

It is another object of this invention to provide a cured resin comprising an ethylenically unsaturated polyester resin copolymerized with a polymerizable monomer, which resin has improved properties of heat distortion, flexural strength, hardness and chemical and solvent resistance.

These and other objects are attained by the practice of this invention which, briefly, comprises providing a polyester of an ethylenically unsaturated dicarboxylic acid or anhydride, a glycol, a di- or tricarboxylic acid or anhydride containing no ethylenic unsaturation and a carbocyclic tetracarboxylic acid or dianhydride containing from 5 to 12 nuclear carbon atoms. The term "nuclear carbon atoms" is intended to mean the carbon atoms contained in the carbocyclic ring. When this polyester is copolymerized with a polymerizable monomer containing a $CH_2=C=$ group, the cured resin has improved thermal, mechanical and chemical resistant properties.

The tetracarboxylic acids or anhydrides which may be used in the practice of this invention preferably contain no aliphatic unsaturation. Examples of such materials include the dianhydrides listed below and the corresponding tetracarboxylic acids.

3,4,3',4'-diphenylmethane tetracarboxylic dianhydride;
2,3,2'3'-diphenylmethane tetracarboxylic dianhydride;
2,3,3',4'-diphenylmethane tetracarboxylic dianhydride;
2-methyl-3,4,3',4'-diphenylmethane tetracarboxylic dianhydride;
2,2'-dimethyl-3,4,3',4'-diphenylmethane tetracarboxylic dianhydride;
2-ethyl-2'-propyl-3,4,3',4'-diphenylmethane tetracarboxylic dianhydride;
2-amyl-3,4,3',4'-diphenylmethane tetracarboxylic dianhydride;
2-butyl-2'-propyl-3,4,3',4'-diphenylmethane tetracarboxylic dianhydride;
chloro-3,4,3',4'-diphenylmethane tetracarboxylic dianhydride;
dichloro-3,4,3',4'-diphenylmethane tetracarboxylic dianhydride;
bromo-3,4,3',4'-diphenylmethane tetracarboxylic dianhydride;
dibromo-3,4,3',4'-diphenylmethane tetracarboxylic dianhydride;
3,4,3',4'-benzhydrol tetracarboxylic dianhydride;
2,3,2',3'-benzhydrol tetracarboxylic dianhydride;
2,3,3',4'-benzhydrol tetracarboxylic dianhydride;
2-methyl-3,4,3',4'-benzhydrol tetracarboxylic dianhydride;
2,2'-dimethyl-3,4,3',4'-benzhydrol tetracarboxylic dianhydride;
2-butyl-2'-propyl-3,4,3',4'-benzhydrol tetracarboxylic dianhydride;
3,4,3',4'-benzhydrol tetracarboxylic dianhydride methyl ether;
3,4,3',4'-benzhydrol tetracarboxylic dianhydride ethyl ether;
2,3,3',4'-benzhydrol tetracarboxylic dianhydride propyl ether;
2,3,2',3',-benzhydrol tetracarboxylic dianhydride butyl ether;
3,4,3',4'-benzhydrol tetracarboxylic dianhydride acetate;
3,4,3',4'-benzhydrol tetracarboxylic dianhydride propionate;
2,3,3',4'-benzhydrol tetracarboxylic dianhydride butyrate;
3,4,3',4'-benzophenone tetracarboxylic dianhydride;
2,3,2',3'-benzophenone tetracarboxylic dianhydride;
2,3,3',4'-benzophenone tetracarboxylic dianhydride;
2-methyl-3,4,3',4'-benzophenone tetracarboxylic dianhydride;
2,2'-dimethyl-3,4,3',4'-benzophenone tetracarboxylic dianhydride;
2-ethyl-2'-methyl-3,4,3',4'-benzophenone tetracarboxylic dianhydride;
2-butyl-2'-ethyl-3,4,3',4'-benzophenone tetracarboxylic dianhydride;
2-amyl-3,4,3',4'-benzophenone tetracarboxylic dianhydride;
2-butyl-2'-propyl-3,4,3',4'-benzophenone tetracarboxylic dianhydride;
2-chloro-2'-methyl-3,4,3',4'-benzophenone tetracarboxylic dianhydride;
2,2'-dichloro-3,4,3',4'-benzophenone tetracarboxylic dianhydride;
2-chloro-3,4,3',4'-benzophenone tetracarboxylic dianhydride;
2-bromo-3,4,3',4'-benzophenone tetracarboxylic dianhydride;
2-iodo-3,4,3',4'-benzophenone tetracarboxylic dianhydride;
2-fluoro-3,4,3',4'-benzophenone tetracarboxylic dianhydride;

2,5'-dichloro-2',3',3,4-benzophenone tetracarboxylic dianhydride;
pyromellitic dianhydride; and
cyclopentane dianhydride.

The tetracarboxylic acid or dianhydride is used in an amount of from 1 to about 10% by weight of the polyester and, more preferably, in an amount of from about 1 to 5%.

The ethylenically unsaturated dicarboxylic acid or anhydride component used in the preparation of the polyester may be maleic acid, maleic anhydride, chloromaleic acid, fumaric acid, citraconic acid, itaconic acid, mesaconic acid, ethyl maleic acid, etc.

The di- or tricarboxylic acid or anhydride containing no ethylenic unsaturation which may be used include phthalic acid, isophthalic acid, tetrachlorophthalic acid, tetrahydrophthalic acid, chlorendic acid, trimellitic acid, succinic acid, adipic acid, azelaic acid, sebacic acid and the corresponding anhydrides thereof and Nadic methyl anhydride. It is preferred that not more than about 80 mole percent of the total content of ethylenically unsaturated acid or anhydride and di- or tricarboxylic acid or anhydride containing no ethylenic unsaturation be the di- or tricarboxylic acid or anhydride component.

Examples of glycols which may be used in the preparation of the polyesters of this invention include ethylene glycol, propylene glycol, butanediol-1,4, diethylene glycol, dipropylene glycol, neopentyl glycol, pentanediol-1,5, triethylene glycol, tripropylene glycol and hydrogenated Bisphenol A. It is frequently desirable to use a mixture of glycols such as a mixture of ethylene glycol and propylene glycol.

The polyesters of this invention may be prepared by reacting the ethylenically unsaturated dicarboxylic acid or anhydride, the di- or trisubstituted acid or anhydride containing no ethylenic unsaturation, the glycol and the tetracarboxylic acid or dianhydride to effect an esterification of these components. An esterification catalyst is not necessary since esterification proceeds on heating of the reaction mixture. However, if desired, an esterification catalyst may be employed. The reaction is advantageously carried out under an inert atmosphere such as nitrogen. Approximately stoichiometric amounts of glycol and polycarboxylic components are used, with the glycol preferably being used in slight excess. Esterification is permitted to proceed until an acid number (which is defined as the number of milligrams of potassium hydroxide required to neutralize the free acids in 1 gram of polyester) of below 60 and, more preferably, below 40 is reached. The reaction mixture is then cooled to prevent further esterification.

The resultant ethylenically unsaturated polyester is then combined with the polymerizable monomer containing a $CH_2=C=$ group. For example, the polyester may be dissolved in styrene. The polymerizable monomer is used in an amount of from 5 to about 70% and, more preferably, from about 5 to 50% by weight based on the total weight of the unsaturated polyester-polymerizable monomer combination.

While styrene is the preferred polymerizable monomer due to its ready availability, other monomers may also be used such as methyl methacrylate, butyl acrylate, vinyl toluene, α-methyl styrene, dichlorostyrene, divinyl benzene, diallyl, phthalate, triallyl trimellitate and triallyl cyanurate.

The polyester-polymerizable monomer mixture may be cured by the use of a free-radical type catalyst such as benzoyl peroxide, p-chlorobenzoyl peroxide, lauroyl peroxide, methyl ethyl ketone peroxide, cyclohexanone peroxide, t-butyl hydroperoxide, cumene hydroperoxide, t-butyl perbenzoate, t-butyl peroxyisobutyrate, di-t-butyl diterphthalate, di-t-butyl peroxide, dicumyl peroxide, etc. Decomposition of a peroxide catalyst may be initiated by the use of heat or, at room temperature, by the use of an activator such as cobalt naphthenate, dimethyl aniline, N,N-dimethyl-p-toluidine, lauryl mercaptan, manganese naphthenate and hydroquinone.

The polyester-polymerizable monomer copolymers of this invention may be used as laminating agents for fiber glass, casting resin, etc. Fillers and reinforcements such as described in Section III of the "Handbook of Reinforced Plastics" by S. S. Oleesky and J. G. Mohr, Rheinhold Publishing Co., New York (1964) pp. 117–268 can be used. The use of a small amount of tetracarboxylic acid or dianhydride in the polyester in accordance with this invention results in an upgrading of the thermal, mechanical and chemical properties of the final cured resin as compared to a resin containing only a dicarboxylic or tricarboxylic acid modifier.

The following examples illustrate the best modes contemplated for carrying out this invention.

EXAMPLES 1 TO 4

Into a one-liter resin kettle fitted with a reflux condenser, a Dean-Stark trap, a stirrer, a nitrogen inlet, a thermometer and a sample tube are charged maleic anhydride (49.3 g.; 0.5 mole) propylene glycol (114.1 g.; 1.5 mole) and the amounts of phthalic acid and 3,4,3',4'-benzophenone tetracarboxylic dianhydride (hereinafter referred to as BTDA) indicated in Table 1. The reactants are heated until liquid and then stirring is commenced. The temperature is raised to 150° C. over a period of one hour and maintained at 150° C. for an additional hour. The temperature is then raised to 215–200° C. over a 3–4 hour period. Refluxing starts at 160°–165° C. About 60–70% of the theoretical amount of water of reaction is removed during this period. The temperature of the reaction mixture is maintained at 215–220° C. until the acid number reaches about 80. The temperature is then rapidly dropped to 170–175° C. and ethylene glycol (9.3 g.; 0.15 mole) is added. The mixture is heated at 180° C. for about forty-five minutes and then the temperature is raised to 215–220° C. The mixture is cooked until the acid number is about 50 after which the temperature is lowered to about 190° C. Xylene is added to the reaction mixture (4% by weight based on the total weight of the mixture) and the mixture is distilled azeotropically until the acid number is below 40. The precondensing is then discontinued, 0.03% by weight of hydroquinone inhibitor is added and 70% by weight of the xylene is distilled off. The remaining mixture is purged with a stream of nitrogen until all of the remaining xylene is removed. The reaction mixture is then rapidly cooled to room temperature. The polyester products have the acid number indicated in Table 1. For purposes of comparison, a standard polyester (control) is prepared under the same conditions but omitting the BTDA.

TABLE 1

| Example | BTDA | Phthalic anhydride | Acid equivalents BTDA | Acid equivalents Phthalic anhydride | Acid No. of product |
|---|---|---|---|---|---|
| Control | 0 | 148.1 g.; 1.0 mole | 0 | 2.0 | 35.0 |
| 1 | 4.0 g.; 0.0125 mole | 144.5 g.; 0.975 mole | 0.05 | 1.95 | 27.8 |
| 2 | 8.0 g.; 0.025 mole | 140.6 g.; 0.95 mole | 0.10 | 1.90 | 36.5 |
| 3 | 12.1 g.; 0.0375 mole | 137.0 g.; 0.925 mole | 0.15 | 1.85 | 29.0 |
| 4 | 16.1 g.; 0.05 mole | 133.3 g.; 0.90 mole | 0.20 | 1.80 | [1] 44.0 |

[1] Gel.

Curable compositions are prepared from the polyesters of Examples 1, 2 and 3 and the control by dissolving 75 g. of the polyester and 1.1 g. of benzoyl peroxide in 40.0 g. of styrene. The formulations are mixed, poured into molds and cured for one hour at 77° C. and for two hours at 122° C. The properties of the resultant cast resins are then evaluated. Heat distortion temperature is determined by ASTM Method D-648-56; Flexural strength is determined by ASTM Method D-790-63; Rockwell M hardness is determined by ASTM Method D-785-62; and Resistance to various solvents is determined by ASTM Method D-543-60T. The test results are set forth in Table 2. Also set forth in Table 2 is the percent by weight of BTDA contained in the cast resin.

TABLE 2

| Polyester of example | Percent by weight BDTA in resin | Heat distortion temp., °C. | Flexural strength, p.s.i. | Rockwell M hardness | Percent weight change after 3 days at 160° F. | | | |
|---|---|---|---|---|---|---|---|---|
| | | | | | Heptane | 10% NaOH | 20% $H_2SO_4$ | $H_2O$ |
| Control | 0 | 64 | 5895 | 87 | +1.8 | −7.3 | +0.37 | +1.9 |
| 1 | 0.88 | 77 | 7990 | 104 | +1.1 | −6.4 | +0.25 | +1.4 |
| 2 | 1.76 | 78 | 9270 | 103 | −0.13 | −4.6 | +0.42 | +1.6 |
| 3 | 2.64 | 78 | 15,450 | 104 | −0.10 | −4.3 | +0.18 | +1.5 |

As is seen from Table 2, the inclusion of small amounts of BTDA in an unsaturated polyester results in considerable improvement in the general overall properties of a cross-linked resin prepared from the polyester.

Other similar resins may be prepared by the process set forth in the preceding examples and in the more general description of this invention set forth hereinabove. For example, the BTDA used in Examples 1 to 4 may be replaced by equimolar amounts of 3,4,3',4'-benzophenone tetracarboxylic acid, pyromellitic acid or dianhydrided, cyclopentane dianhydride or cyclopentane tetracarboxylic acid.

We claim:
1. A polyester resin of an ethylenically unsaturated dicarboxylic acid or anhydride, a glycol a di- or tricarboxylic acid containing no ethylenic unsaturation, and a carbocyclic tetracarboxylic acid or dianhydride containing from 5 to 12 nuclear carbon atoms, wherein said tetrecarboxylic acid or dianhydride is present in said polyester in an amount of from about 1.00 to about 5.0% by weight.

2. A polyester as defined in claim 1 wherein said carbocyclic tetracarboxylic acid or dianhydride is selected from the group consisting of 3,4,3',4'- benzophenone tetracarboxylic dianhydride, 3,4,3',4'-benzophenone tetracarboxylic acid, pyromellitic dianhydride, pyromellitic acid, cyclopentane dianhydride and cyclopentane tetracarboxylic acid.

3. A polyester as defined in claim 2 wherein said tetracarboxylic acid of dianhydride is 3,4,3',4' - benzophenone tetracarboxylic dianhydride and wherein said polyester has an acid number below about 60.

4. A polyester resin obtained by the condensation reaction of maleic anhydride, phthalic anhydride, 3,4,3',4'-benzophenone tetracarboxylic dianhydride, ethylene glycol and propylene glycol, said 3,4,3',4'-benzophenone tetracarboxylic dianhydride being present in an amount of less than 5% by weight of the total reactants, said polyester having an acid number below about 40.

5. A curable composition comprising an admixture of a polyester as defined by claim 2, a polymerizable vinyl monomer.

6. A curable composition comprising an admixture of a polyester as defined by claim 3 and a polymerizable vinyl monomer.

7. A curable composition comprising an admixture of a polyester as defined by claim 4 and a polymerizable vinyl monomer.

8. A cured resin comprising a polyester as defined by claim 2 copolymerized with a polymerizable vinyl monomer.

9. A cured resin comprising a polyester as defined by claim 3 copolymerized with a polymerizable vinyl monomer.

10. A cured resin comprising a polyester as defined by claim 4 copolymerized with a polymerizable vinyl monomer.

References Cited

UNITED STATES PATENTS

| 3,069,179 | 12/1962 | Frey | 260—75 |
| 3,108,085 | 10/1963 | Broadhead | 260—22 |
| 3,213,063 | 10/1965 | Horan et al. | 260—63 |
| 3,391,223 | 7/1968 | Di Leone | 260—871 |
| 3,197,439 | 7/1965 | Frey | 260—75 |

OTHER REFERENCES

Parkyn et al.: Polyesters, vol. 2, Elsevier, New York, 1967 (p. 3).

WILLIAM H. SHORT, Primary Examiner

M. GOLDSTEIN, Assistant Examiner

U.S. Cl. X.R.

161—195; 260—75, 861, 863, 872